(12) United States Patent
Moulios (10) Patent No.: US 7,571,064 B2
(45) Date of Patent: Aug. 4, 2009

(54) DISPLAY DIGITAL SIGNAL VISUALIZATIONS WITH INCREASING ACCURACY

(75) Inventor: Christopher Moulios, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 11/395,343

(22) Filed: Mar. 31, 2006

(65) Prior Publication Data

US 2007/0229527 A1  Oct. 4, 2007

(51) Int. Cl.
*G01R 13/00* (2006.01)
(52) U.S. Cl. .................................................. 702/66
(58) Field of Classification Search ............... 702/66; 358/403; 709/231
See application file for complete search history.

(56) References Cited

U.S. PATENT DOCUMENTS 5,218,455 A * 6/1993 Kristy ....................... 358/403

2006/0010244 A1 * 1/2006 Delzer ........................ 709/231

FOREIGN PATENT DOCUMENTS

GB         2235815 A  *  3/1991

* cited by examiner

*Primary Examiner*—Tung S Lau
*Assistant Examiner*—Xiuquin Sun
(74) *Attorney, Agent, or Firm*—Hickman Palermo Truong & Becker LLP; Edward A. Becker

(57) ABSTRACT

Digital signal visualizations may be displayed with increasing accuracy as the signal data is processed. According to one embodiment, an entire digital signal visualization is displayed as data processing begins. As the digital signal data upon which the visualization is processed, the visualization is refined with increasing accuracy. In one embodiment, a process reads portions of the digital signal data and uses the partial data set to build a visualization of the entire digital signal file. The process continues to read portions of the digital signal data, and uses the additional data to refine the visualization. This process continues until the entire digital signal file is processed and the visualization is displayed with complete accuracy, using all data points.

18 Claims, 5 Drawing Sheets

DISPLAY DIGITAL SIGNAL VISUALIZATIONS WITH INCREASING ACCURACY

FIELD OF THE INVENTION

The present invention relates to displaying digital signal visualizations, and more specifically, increasing the accuracy of display visualizations as digital signal data is read.

BACKGROUND

Digital signals are often represented graphically as series of vertical line segments on a display. The line segments may represent the minimum and maximum range of values for a signal within a segment of time. Multiple line segments are arranged in order (adjacent to each other) to achieve an overview of a larger time period.

This is often performed in the context of displaying digital sound data; for example, digital sound data may be calculated as a series of data plots and displayed as a graph of multiple line or bar segments, each segment representing a value at a certain point in time. Using a display of this type, it would be possible to visualize the dynamic range of a digital sound file at 1 second, 2 seconds, 5 seconds, and so forth.

One approach to the visualization of digital signal data is to fully process the digital signal data, and then after all of the signal data is fully processed, to display a fully rendered visualization. This approach of synchronously calculating the data plot, and then displaying the visualization, results in the user waiting for processing to complete before any part of the visualization may be viewed. This is because for each time segment, all data must be read to determine the minimum and maximum data points to display. The more data to be displayed, the longer it will take to display the visualization. If the process is not threaded, then user interaction may not be possible until the data processing and subsequent visualization display is complete.

Another approach is to render the visualization asynchronously as the digital signal data is read. Using this approach builds the display gradually across the time period as data is read. While this gives a user immediate, accurate feedback on digital signal data, it is very processor-intensive. Further, the rendering of the visualization is very slow, as the visualization progresses along the axis representing time as the signal data is processed. Only when the digital signal data is fully processed is the entire visualization displayed. Much of the visualization is invisible until the process completes. If the process is not threaded, then user interaction may not be possible until the data processing and subsequent visualization display is complete.

While the aforementioned approach improves workflow by not stopping work waiting for display, a user does not receive a view of the full timeline of the data until the end of the process. This makes it difficult to navigate the data.

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques shall be described hereafter for displaying digital signal visualizations with increasing accuracy as the signal data is processed. According to one embodiment, an entire digital signal visualization is displayed as data processing begins. As the digital signal data is processed, the visualization is refined with increasing accuracy.

In one embodiment, a process reads portions of the digital signal data and uses the partial data set to build a visualization of the entire digital signal file. The process continues to read portions of the digital signal data, and uses the additional data to refine the visualization. This process continues until the entire digital signal file is processed and the visualization is displayed with complete accuracy, using all data points.

According to an embodiment, a process reads digital signal data and partitions the data into sections. The partitioning may be physical, logical, both or neither. The process reads digital signal data from each portion and uses the partial data set to build a visualization of the entire digital signal file. The process continues to read digital signal data from each portion of the digital signal data, and uses the additional data to refine the visualization. According to an alternate embodiment, the process may read data from less than each portion. The process continues until the entire digital signal file is processed and the visualization is displayed with complete accuracy, using all data points. Ideally, the process does not read any specific piece of data more than once, although alternate embodiments exist wherein overlapping portions or pieces of data are read.

Displaying Digital Signal Visualizations

Figure 1:
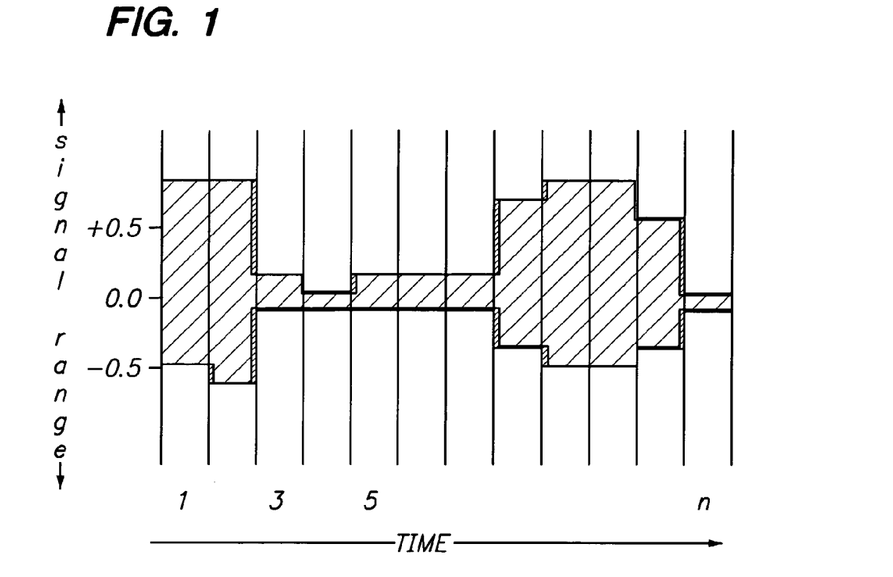
FIG. 1 is a block diagram that illustrates the plotting of digital signal data using minimum and maximum values over time.

Referring to FIG. 1, it is a block diagram illustrating the plotting of digital signal data using minimum and maximum values over time. Values comprising the minimum and maximum values of the digital signal data are plotted on the vertical axis, while time is plotted on the horizontal axis. During each time period, a number of data values are sampled and/or processed.

For example, during time period 1, data points 0-10,000 are sampled and/or processed. The maximum value of the digital signal data within that sample is +0.65 and the minimum value is −0.51. During time period 3, data points 20,000-30,000 are sampled and/or processed. The maximum value of the digital signal data within that sample is +0.05 and the minimum value is −0.03. During time period 5, data points 40,000-50,000 are sampled and/or processed. The maximum value of the digital signal data within that sample is +0.053 and the minimum value is −0.027.

These data points are plotted on a graph. In one embodiment, the data points within the maximum and minimum values are filled in, as in FIG. 1, while other embodiments are envisioned such as simply plotting the maximum and minimum values. In the preferred embodiment, the entire visualization is displayed and refined with increasing accuracy as additional data points are sampled.

Displaying Visualizations with Increasing Accuracy

Referring to FIG. 2a-2e, they are block diagrams illustrating the display of a digital signal visualization with increasing accuracy according to an embodiment of the invention. For purposes of FIG. 2a-2e, the digital signal data is a twenty-second sound file. Other embodiments are envisioned where the digital signal data comprises data other than sound.

Figure 2A:
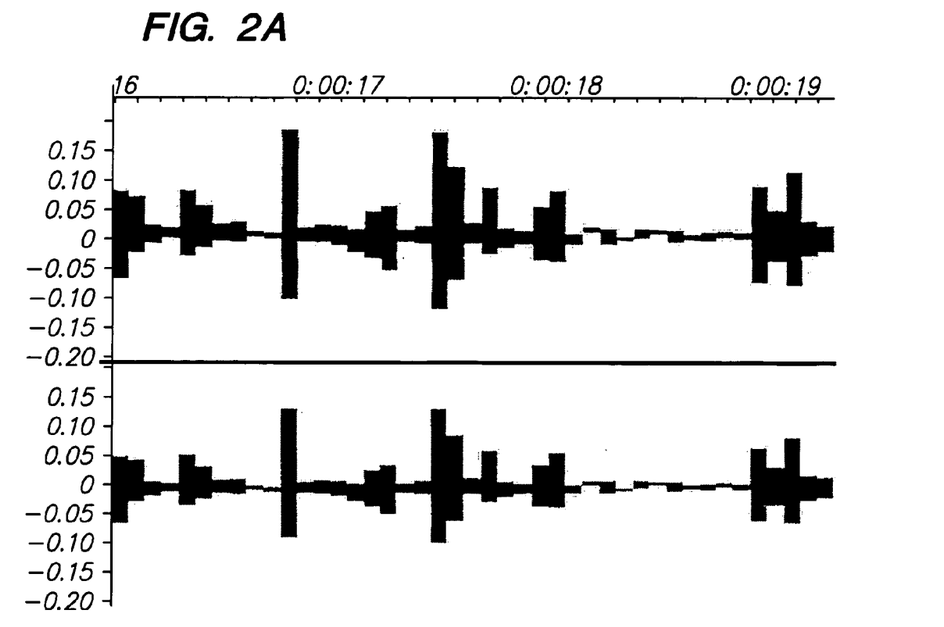
FIG. 2a-2e is a block diagram illustrating the steps of displaying a digital signal visualization with increasing accuracy according to an embodiment of the invention.

In one embodiment, the digital signal data is sampled at uniform intervals. In other embodiments, the digital signal data is sampled at nonuniform intervals. An example of sampling at uniform intervals is illustrated in FIG. 2a. As shown in FIG. 2a, during the first second of processing the digital signal data, one-twentieth of the digital signal data is sampled from evenly spaced intervals of the file. This first sample of the data are plotted and displayed. Because only one-twentieth of the signal data has been processed, the display may be coarse and not completely accurate; however, even this coarse graph provides to a user immediate feedback and information about the entire signal. The user may use this information to continue work on the file as the remainder of the signal data is processed and plotted.

For example, referring to FIG. 2a, a user may approximate from this display where the loudest and softest volumes in the file are located after only one-twentieth of the digital signal data has been processed. The visualization is at one-twentieth of the final resolution. If FIG. 2a-2e represented the processing of a movie soundtrack, a user could ascertain that there are very loud sounds approximately one-third and one-half the way through the file. This would likely not represent quiet portion such as dialogue, but could represent explosions. As a result, a user wishing to edit the portion of the file containing a loud explosion could know within one second that the relevant portion is likely either one-third or one-half way into the data and scan accordingly.

Although the techniques disclosed herein are discussed using the example of digital signal data representing sound, the disclosed techniques may be used for any type of digital signal data. For example, another embodiment may provide a user with a view of stock prices or trading volume of a given security over a period of time. If FIG. 2a were representative of that type of digital signal data, then the user could approximate the highest and lowest prices or trading volume of the security after only one-twentieth of the digital signal data has been processed. Other examples of digital signal data that may be processed by an embodiment of this invention include lie detector data, seismographic data, or any data that may be plotted over an interval.

Figure 2B:
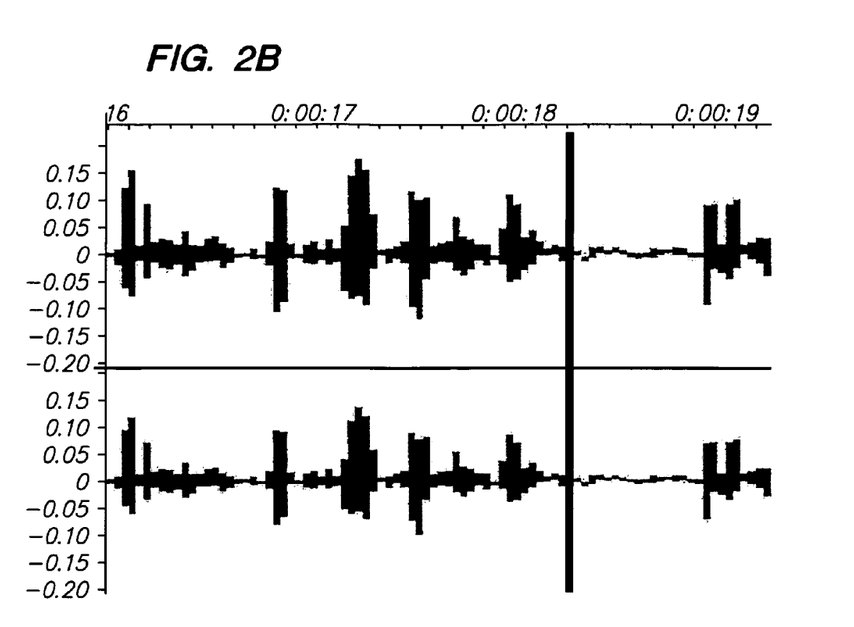

Referring to FIG. 2b, the visualization after a second of processing is illustrated. At this point, another one-twentieth of the digital signal data has been sampled from evenly spaced intervals of the file, resulting in one-tenth of the total digital signal data being processed. The visualization is at one-tenth of the final resolution. Because a greater number of data points have been processed and plotted, the graph comprises greater detail than FIG. 2a. In one embodiment, the previous visualization is erased and the new, more detailed visualization is drawn. In another embodiment, the visualization is redrawn on-the-fly and appears to morph into shape as time progresses.

Figure 2C:
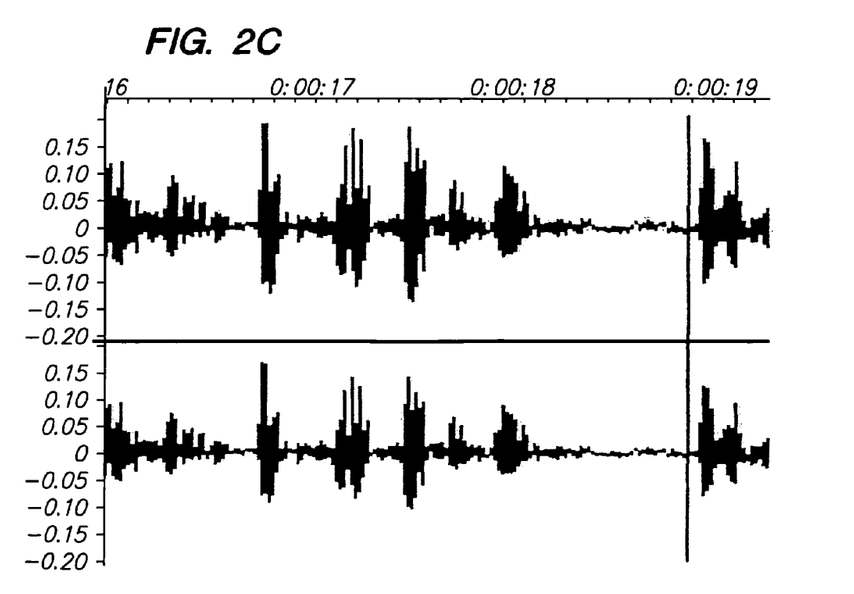

Referring to FIG. 2c, the visualization after five seconds of processing is illustrated. At this point, one-fourth of the digital signal data has been sampled from evenly spaced intervals of the file, resulting in one-fourth of the total digital signal data being processed. The visualization is at one-fourth of the final resolution.

Figure 2D:
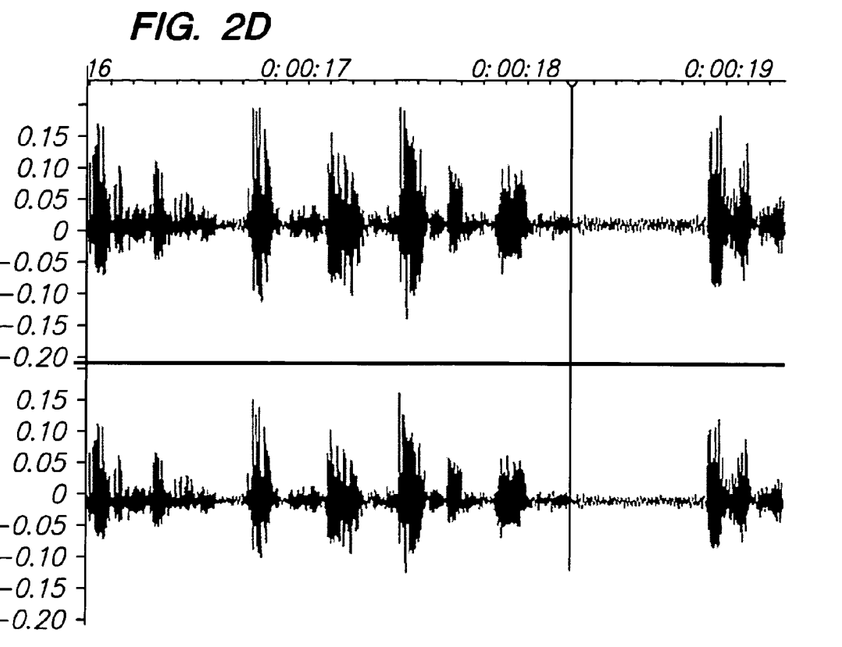

Referring to FIG. 2d, the visualization after ten seconds of processing is illustrated. At this point, one-half of the digital signal data has been sampled from evenly spaced intervals of the file, resulting in one-half of the total digital signal data being processed. The visualization is at one-half of the final resolution.

Figure 2E:
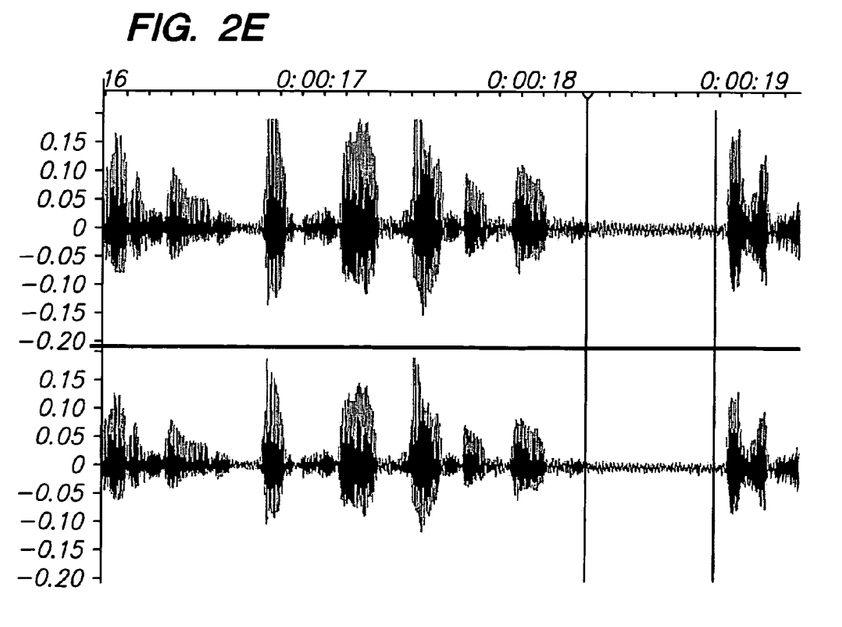

Referring to FIG. 2e, the visualization after twenty seconds of processing is illustrated. At this point, the entire digital signal data has been processed and the visualization is at full resolution.

Figure 3:
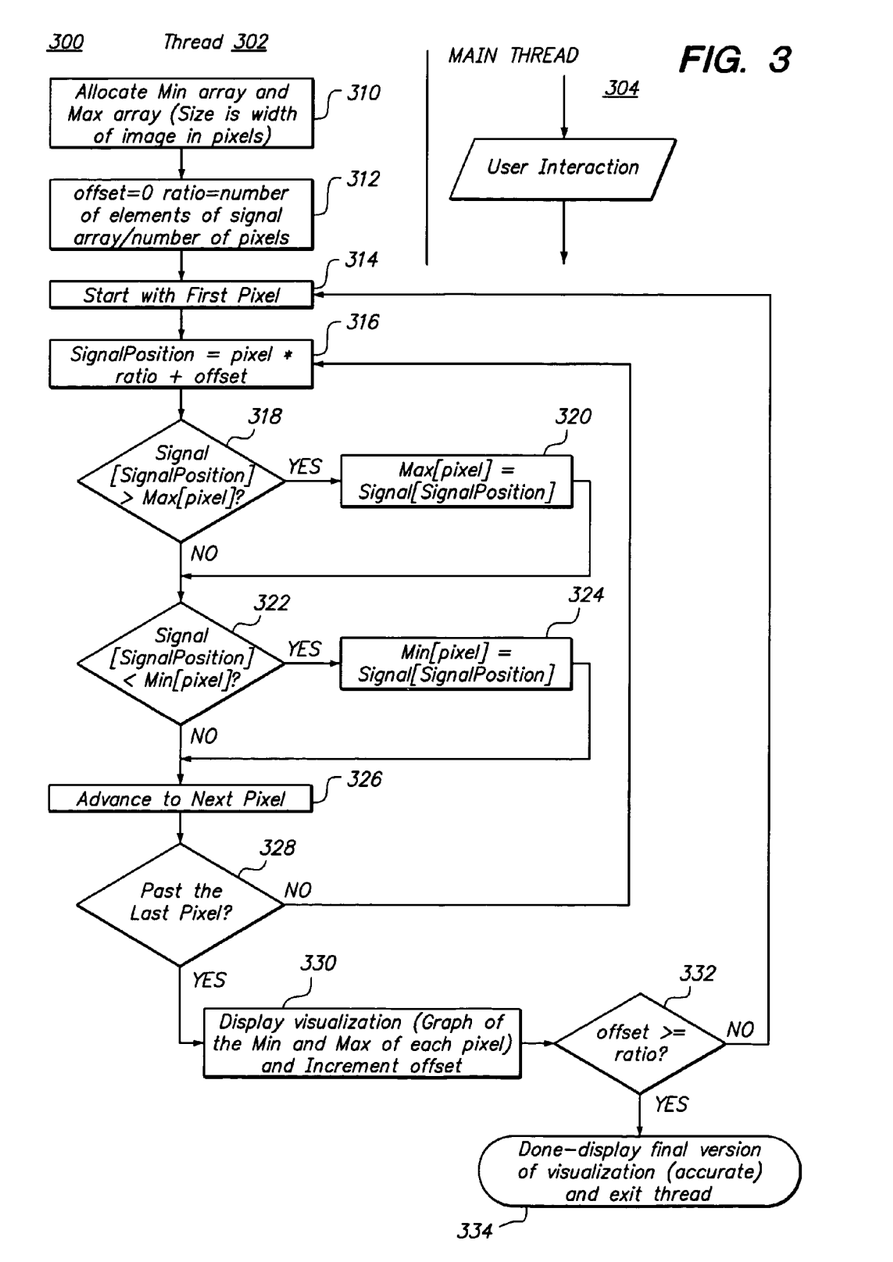
FIG. 3 is a flow diagram that illustrates the general steps involved in each of the phases of displaying digital signal visualizations with increasing accuracy, according to an embodiment of the invention.

Referring to FIG. 3, it is a flowchart 300 that illustrates the general steps involved in each of the phases of displaying digital signal visualizations with increasing accuracy, according to an embodiment of the invention. In one embodiment, the process consists of a separate thread to process and display the digital signal data 302; as a result, a user may continue to interact with other concurrent threads 304.

According to one embodiment of the invention, arrays are allocated 310 for storing the minimum and maximum values of the digital signal data. In one embodiment, the size of the array is the width of the visualization image in pixels. For each pixel of the visualization, the array Max[pixel] will store the highest possible value and the array Min[pixel] will store the lowest possible value, where [pixel] represents the element of the array corresponding to the screen pixel of the visualization. In one embodiment, millions of data elements are mapped to a single pixel. The ratio of data elements to pixels is used to determine which data elements to sample in each iteration, as shall be described hereafter. An offset variable is set to zero 312 and a ration is established which in one embodiment is the number of elements in the array divided by the number of pixels. The process begins on the first pixel of the visualization 314.

The data element (signal position) to be sampled for the first pixel is calculated to be the data in the signal array at the offset one computes; or, the signal data at the position one calculates. For example, "Signal Position=SignalDataArray [pixel*ratio+offset]" or "Signal Position=data at the location: pixel*ratio+offset]" 316. For example, if the ratio of data elements to pixels is 10 data elements mapped to 1 pixel, then the ratio is 10. Therefore, in this example, the first data element to be sampled is [(1*10)+0=10].

If the signal position is greater than the value of Max[pixel] 318, then Max[pixel] is set to the value of the signal position 320. Otherwise, if the signal position is less than the value of Min[pixel] 322, then Min[pixel] is set to the value of the signal position 324. The process then advances to the next pixel 326. If this does not take the process past the last pixel 328, then control reverts to step 316. If the process advances past the last pixel, then the visualization is displayed based upon data read so far, using data in the array, and the offset is incremented 330. If the offset is not greater than or equal to the ratio 332, control reverts to step 314; otherwise, the visualization is displayed based upon the data and the process terminates 334.

In one embodiment, use of the ratio and offset allow noncontiguous samples to be read from the digital signal data. In one embodiment, no more data is read than needed, just different portions of the data are read at a given time. Other embodiments are envisioned where portions of data in the samples are sampled multiple times. The digital signal data is read nonsequentially and the actual visualization of the waveform is progressively buffered into memory. As the complete representation of the data set is built in memory, the digital signal visualization is built from it on the fly. In one embodiment, the ending of the process and the completion of the visualization is indicated by the visualization changing color temporarily. Other embodiments are envisioned where the color change is permanent and may be accompanied by an alert such as a sound or display of a dialog box.

Hardware Overview

Figure 4:
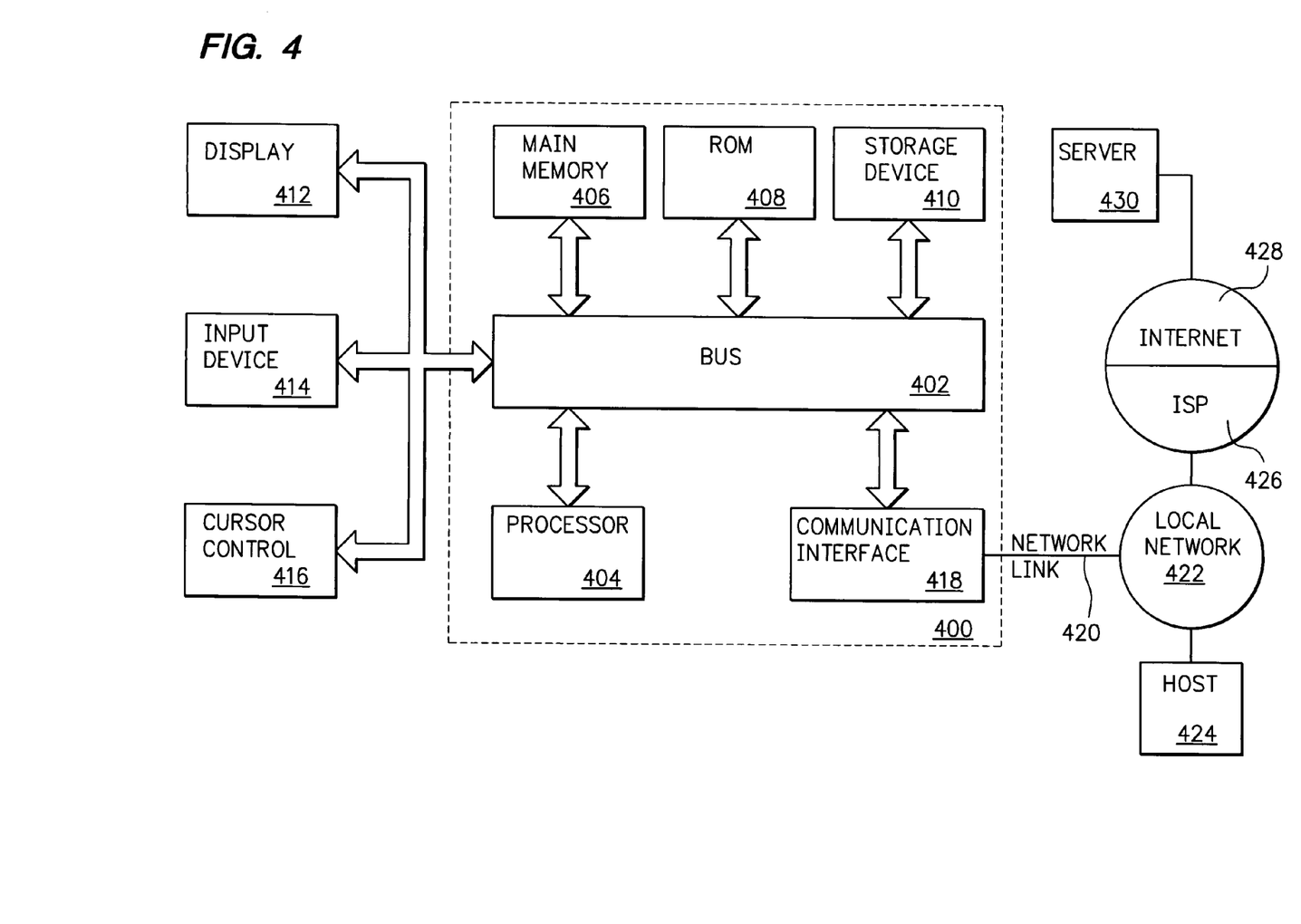
FIG. 4 is a block diagram illustrating a computer system upon which an embodiment of the invention may be implemented.

FIG. 4 is a block diagram that illustrates a computer system 400 upon which an embodiment of the invention may be implemented. A computer system as illustrated in FIG. 4 is but one possible system on which embodiments of the invention may be implemented and practiced. For example, embodiments of the invention may be implemented on any suitably configured device, such as a handheld or otherwise portable device, a desktop device, a set-top device, a networked device, and the like, configured for recording, processing or playing audio files. Hence, all of the components that are illustrated and described in reference to FIG. 4 are not necessary for implementing embodiments of the invention.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a system user. In the context of computer system 400 as an audio recording and playback system, computer system 400 may be coupled to an audio output device, such as speakers or a headphone jack, for playing audio to a system user. An input device 414, including alphanumeric and other keys, is coupled to bus 402 for communicating information and command selections to processor 404. Another type of user input device is cursor control 416, such as a mouse, a trackball, a stylus or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

Alternative embodiments of the invention are described throughout the foregoing ion, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

Further, in the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for visualizing a signal having a particular duration, wherein the entire signal, over said particular duration, is represented by digital signal data, the method comprising:
   (a) reading an initial portion of digital signal data, wherein said initial portion (i) is a subset of the digital signal data, (ii) contains non-contiguous samples from said digital signal data, and (iii) represents the signal over the entirety of the particular duration;
   (b) displaying a visualization of the signal, over the entirety of the particular duration, on a particular screen based upon said initial portion, wherein the visualization is a plot of the signal over the entirety of the particular duration, thereby providing immediate feedback and information about the signal for the entirety of the duration;
   (c) reading a next portion of digital signal data, wherein said next portion is a subset of said digital signal data and contains non-contiguous samples from said digital signal data, wherein the samples included in said next portion are different than the samples in any previously-read portion of the digital signal data;
   (d) updating the visualization of the signal, over the entirety of the particular duration, on said particular screen based upon all portions of the signal that have been read from the digital signal data; and
   (e) repeating steps (c) and (d) until the visualization reflects all of said digital signal data.

2. The method of claim 1, wherein said digital signal data comprises sound data.

3. The method of claim 1, wherein said digital signal data comprises data other than sound data.

4. The method of claim 1, wherein the samples included in said next portion include samples that were included in a previously-read portion of the digital signal data.

5. The method of claim 1, wherein (d) updating the visualization of the entire signal on said particular screen based upon all portions of the signal that have been read from the digital signal data comprises redrawing a previous visualization of the entire signal.

6. The method of claim 1, wherein (d) updating the visualization of the entire signal on said particular screen based upon all portions of the signal that have been read from the digital signal data comprises performing progressive refinement of a previous visualization of the entire signal.

7. The method of claim 1, wherein said portions of said data are sampled from uniform intervals in said digital signal data.

8. The method of claim 1, wherein said portions of said data are sampled from nonuniform intervals in said digital signal data.

9. A computer-readable storage medium storing one or more sequences of instructions which, when executed by one or more processors, causes the one or more processors to perform the method comprising:
   (a) reading an initial portion of digital signal data, wherein the digital signal data represents the signal over a particular duration, wherein said initial portion (i) is a subset of the digital signal data, (ii) contains non-contiguous samples from said digital signal data, and (iii) represents the signal over the entirety of the particular duration;
   (b) displaying a visualization of the signal, over the entirety of the particular duration, on a particular screen based upon said initial portion, wherein the visualization is a plot of the signal over the entirety of the particular duration, thereby providing immediate feedback and information about the signal for the entirety of the duration;
   (c) reading a next portion of digital signal data, wherein said next portion is a subset of said digital signal data and contains non-contiguous samples from said digital signal data, wherein the samples included in said next portion are different than the samples in any previously-read portion of the digital signal data;
   (d) updating the visualization of the signal, over the entirety of the particular duration, on said particular screen based upon all portions of the signal that have been read from the digital signal data; and
   (e) repeating steps (c) and (d) until the visualization reflects all of said digital signal data.

10. The computer-readable storage medium of claim 9, wherein said digital signal data comprises sound data.

11. The computer-readable storage medium of claim 9, wherein said digital signal data comprises data other than sound data.

12. The computer-readable storage medium of claim 9, wherein the samples included in said next portion include samples that were included in a previously-read portion of the digital signal data.

13. The computer-readable storage medium of claim 9, wherein (d) updating the visualization of the entire signal on said particular screen based upon all portions of the signal that have been read from the digital signal data comprises redrawing a previous visualization of the entire signal.

14. The computer-readable storage medium of claim 9, wherein (d) updating the visualization of the entire signal on said particular screen based upon all portions of the signal that have been read from the digital signal data comprises performing progressive refinement of a previous visualization of the entire signal.

15. The computer-readable storage medium of claim 9, wherein said portions of said data are sampled from uniform intervals in said digital signal data.

16. The computer-readable storage medium of claim 9, wherein said portions of said data are sampled from nonuniform intervals in said digital signal data.

17. A method for visualizing digital signal data, the method comprising:
   reading a first unique subset of data values from a file of digital signal data, wherein said first unique subset includes non-contiguous samples of said digital signal data;
   displaying a visualization of said file based upon said unique subset;
   reading a second unique subset of data values from said digital signal data, wherein said second unique subset includes non-contiguous samples of said digital signal data;
   refining said visualization based upon said second unique subset; and
   continuing to (a) read unique subsets of data values from said digital signal data, wherein said each unique subset includes non-contiguous samples of said digital signal data, and (b) refine the visualization, until all data values contained in said digital signal data have been read;
   wherein all subsequent unique subsets of data values are different than any previous unique subsets of data values.

18. A computer-readable storage medium storing one or more sequences of instructions which, when executed by one or more processors, causes:
   reading a first unique subset of data values from a file of digital signal data, wherein said
   first unique subset includes non-contiguous samples of said digital signal data;
   displaying a visualization of said file based upon said unique subset;
   reading a second unique subset of data values from said digital signal data, wherein said
   second unique subset includes non-contiguous samples of said digital signal data;
   refining said visualization based upon said second unique subset; and
   continuing to (a) read unique subsets of data values from said digital signal data, wherein said each unique subset includes non-contiguous samples of said digital signal data, and (b) refine the visualization, until all data values contained in said digital signal data have been read;
   wherein all subsequent unique subsets of data values are different than any previous unique subsets of data values.

* * * * *